Jan. 19, 1971  R. E. BLAIR III  3,556,557
MOTORCYCLE FORK EXTENSION
Filed June 11, 1969
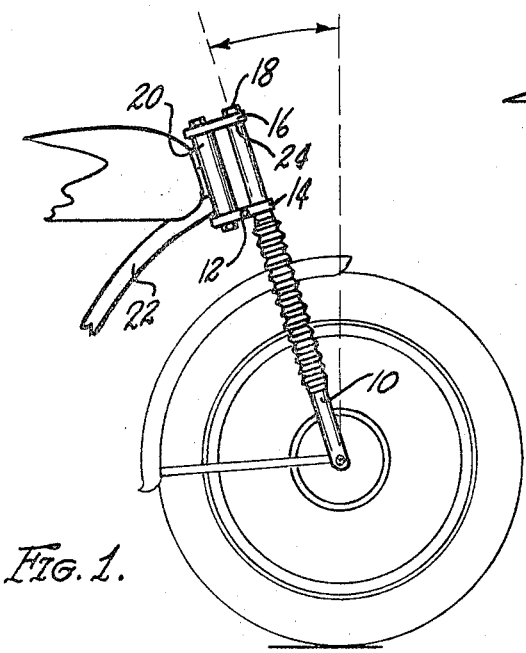
FIG. 1.
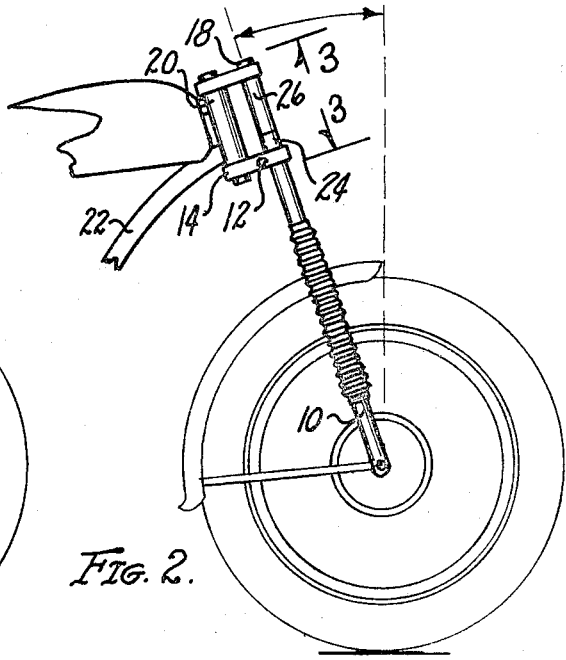
FIG. 2.
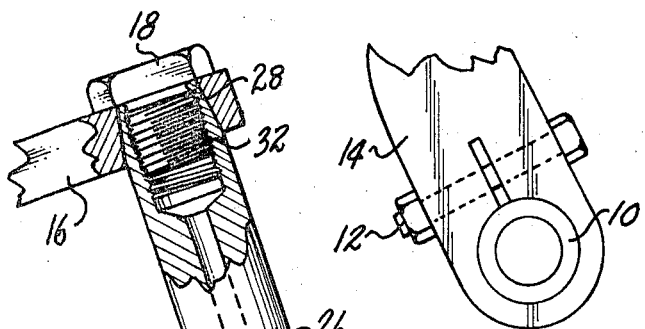
FIG. 3.
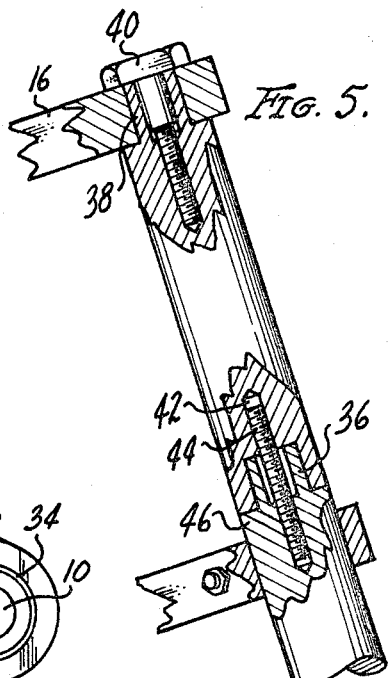
FIG. 5.
FIG. 4.
FIG. 7.
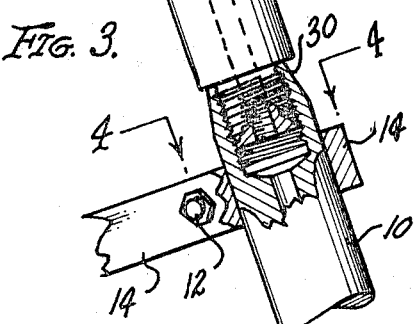
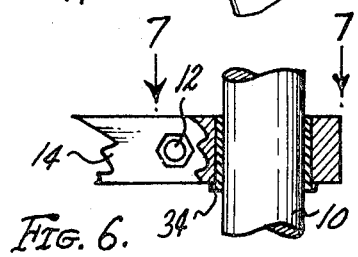
FIG. 6.
INVENTOR.
ROBERT E. BLAIR, III
By LIONEL V. TEFFT
Attorney

United States Patent Office 3,556,557
Patented Jan. 19, 1971

3,556,557
MOTORCYCLE FORK EXTENSION
Robert E. Blair III, 22622 Van Buren St.,
Colton, Calif. 92324
Filed June 11, 1969, Ser. No. 832,284
Int. Cl. B62k 21/02
U.S. Cl. 280—279                 5 Claims

ABSTRACT OF THE DISCLOSURE

An elongated member is connected to the top end of a motorcycle front fork post, and bridges the distance between the upper and lower brackets of a motorcycle front end steering assembly to form a downward and forward extension of the front fork. The said member has substantially the same cross-sectional configuration as the post, and its bottom end is shaped to receive the top end of the post and has a threaded stem that screws into a tapped hole in the post. The top end of the member is formed to seal within a cavity in the upper bracket and has a longitudinally extending tapped hole in its center to receive a cap screw, the head of which seats on the top of the upper bracket to prevent downward movement of the member with respect thereto. When the extension member is in place, the lower bracket is clamped tightly to the upper end of the fork post, and the extension member spans most of the distance between the lower and upper brackets.

---

Single or multiple elements for attachment to and extension of the front forks of conventional motorcycles for better riding, more road clearance and better fork action especially in off terrain use.

One of the main objects of the invention is to provide easily attachable dual elements for extending the front forks of foreign and domestic motorcycles.

Another object o the invention is in the provision of front fork extensible elements that are readily attachable to the conventional triple bracket supports of motorcycles.

Still another object of the invention lies in the machine design and formation of motorcycle front frok extending devices that can be quickly and easily installed by the operator.

Yet another object of the invention is to provide dual fork extension elements that incorporate a general arrangement of parts that can be varied for attachment to foreign or domestic motorcycles.

In relatively recent times, there has been a popular trend toward the use of extra-long front forks, which raise the front end of the motorcycle and give it a decidedly rakish look, making it appear more powerful and speedy, and giving it an aura of masculine glamour that is tremendously appealing to the group of young males forming the bulk of today's motorcycle riders. In addition to the rakish appearance that they give to the motorcycle these extra-long front forks have several practical advantages. They give improved handling, because of better directional stability, owing to the greater rake (caster) angle. They also improve weight transfer by raising the center of gravity and moving it slightly rearward. Ground clearance is increased, and the wheel base is lengthened slightly. All of these advantages have made the extra-long forks extremely popular.

Heretofore, these extra-long forks have usually been made up at a considerable expense to the motorcycle owner by welding and machining a new set of forks. The cost of such specially made forks runs up to several hundreds of dollars, and has prevented many motorcycle owners from enjoying the ownership of a much-wanted pair of extra-long forks. The present invention makes it possible for a motorcycle owner to convert his standard-length front forks to extra-long front forks by merely attaching a specially designed extension member to the upper end of the post member (of which there are usually two arranged side-by-side), and this extension member is then clamped to the upper bracket instead of the post member.

The fundamental theory of the present invention is to provide an easily attachable front fork motorcycle extension that is absolutely safe, secure and benefits rather than retards operational features. The present dual elements may be changed somewhat for adaptation to foreign and domestic vehicles but they are attached and function in exactly the same manner. As shown in the drawings, the extension of the front forks increases clearance and changes front wheel fork action.

These and other objects and advantages of the present invention will become apparent to those skilled in the art upon consideration of the following detail description of the preferred embodiment thereof, reference being made to the accompanying drawings, herewith wherein:

FIG. 1 is an elevational view of conventional motorcycle front wheel fork construction;

FIG. 2 is a similar view with extension in attached position;

FIG. 3 is a view partially in section and broken away taken on the line 3—3 of FIG. 2, indicating domestic fork construction and extension;

FIG. 4 is a view taken on the line 4—4 of FIG. 3;

FIG. 5 is a view similar to FIG. 3 showing the device modified to fit foreign fork design;

FIG. 6 is a partial elevational and sectional view showing a sleeve modification to take care of different sizes of domestic cycles; and FIG. 7 is a view taken on the line 7—7 of FIG. 6.

Referring to FIG. 1 of the drawings, the front fork wheel suspension of a conventional motorcycle has been shown. A pair of forks 10 are clamped at 12 in a lower bracket 14 and have an upper spaced bracket 16 connection by means of a cap screw 18. Both brackets 14 and 16 have a central pivotal connection at 20 with the forward frame portion 22. Each of the front fork members 10 has an upper post of cylindrical cross section (see FIG. 4), which passes through a hole in the lower bracket 14 and is clamped therein. The top end of the post 10 has a longitudinally extending, internally threaded hole formed in the center thereof, as shown in FIG. 3, which receives the cap screw 18.

It is desired to extend the dual front forks for various reasons as previously explained. The front forks 10 of FIG. 1 have the cap screws 18 withdrawn, the clamps 12 released and the upper ends 24 of the forks 10 are reclamped in the lower bracket 14 as shown in FIG. 3. The extension of the present invention comprises a pair of short circuit bars 26 that have their lower ends machined to simulate exactly the lower end of the conventional upper bracket and cap screw connection. The lower end construction of the domestic extension is shown in FIG. 3. The upper end of the extensible bars 26 are tapered at 28 to simulate exactly the upper taper 30 on the conventional upper fork ends now gripped in the lower bracket 14. The upper interior of the bars 26 are threaded at 32 to receive the cap screws 18 and thus the extension is safely secured in position as shown in FIG. 2. The diameter of the upper ends of domestic front forks vary and therefore applicant provides a sleeve or sleeves 34 for the detachable extensions.

In FIG. 5 the Japanese type front fork extension devices are shown. They are constructed in exactly the same manner as the domestic devices. The upper ends 36 of the Japanese front forks are simulated exactly in the upper ends of the extensions 38. They are secured in similar manner to the upper bracket 16 by means of the same cap screw 40. The lower end of the Japanese extensions 38 simulate upper bracket connection except that a central interior portion 42 is threaded to receive a stud bolt 44 that connects the extension to the regripped upper fork ends 46 as shown in FIG. 5.

The operation and manner of securement in a safe and rugged manner is believed entirely clear and requires no further explanation. The advantages of the extensible fork devices depend upon the manner of use. It is apparent that the extension devices may be coupled in a multiple manner to increase fork extension if desired. The extension elements are entirely practical for any manner of motorcycle use.

While I have described in considerable detail what I believe to be the preferred form of my invention, it will be understood by those skilled in the art that various changes may be made in the shape and arrangement of the several parts.

I claim:
1. A device for extending the length of the front fork of a motorcycle, in which said front fork comprises at least one upper post member which normally extends between and is clamped to vertically spaced upper and lower brackets that are pivoted on the front end of the motorcycle frame for swinging movement about a downwardly and forwardly inclined axis, said upper post member passing through a hole in said lower bracket member and being clamped therein, and the top end of said upper post member being formed to seat within a correspondingly shaped cavity in said upper bracket, whereby said post member is positively prevented from moving upwardly with respect to said upper bracket, said top end of said post member having a longitudinally extending, internally threaded hole formed in the center thereof, and a cap screw screwed down into said hole, the head of said cap screw seating on the top of said upper bracket to prevent downward movement of said post member with respect thereto, said device comprising:
    an extension member having substantially the same cross-sectional configuration and area as said post member, the length of said member being the amount by which said front forks are to be extended;
    said extension member having means at the lower end thereof cooperating with said upper end of said post member, whereby said extension member and said post member are solidly joined together as one, said means including a threaded stem projecting axially from the bottom end of said extension member and screwing into said internally threaded hole; and
    said extension member having its top end formed to seat within said correspondingly shaped cavity in said upper bracket, said top end of said extension member also having a longitudinally extending, internally threaded hole formed in the center thereof to receive said cap screw;
    said extension member, when joined to the top end of said post member and when secured to said upper bracket, forming an extension of said front fork.

2. An extension device as in claim 1, wherein said upper post member of said front fork and said extension member are both cylindrical members of the same diameter.

3. An extension device as in claim 2, wherein said top end of said post member is conically tapered to fit within a conically tapered hole in said upper bracket, and said extension member is conically tapered to the same angle as said taper in said post member.

4. An extension device as in claim 2, for use on a motorcycle front fork, wherein said top end of said post member is made with a short length of reduced diameter, at the base of which is an upwardly facing annular shoulder that bears against the underside of said upper bracket, and said upper bracket having a cylindrical hole in which said length of reduced diameter is received; said extension member being counterbored at its bottom end to receive said short length of reduced diameter, and said extension member having, at its top end, a short length of reduced diameter and annular shoulder corresponding to the top end of said post member.

5. An extension device as in claim 2, which is further characterized by a split sleeve bushing inserted over the upper end of said post member, said split sleeve bushing having a radial flange projecting outwardly from its bottom edge, said radial flange seating against the underside of said lower bracket to prevent upward movement of said bushing with respect to the lower bracket, and said bushing being disposed within said hole in said lower bracket member and being split lengthwise so that it can be compressed around said post member when said lower bracket member is clamped tightly around the post member, said bushing member serving to increase the diameter of said post member slightly where it passes through said hole in said lower member.

References Cited
UNITED STATES PATENTS

| | | | |
|---|---|---|---|
| 584,316 | 6/1897 | Baum et al. | 280—7.16 |
| 1,326,148 | 12/1919 | Hudry | 280—278 |
| 1,679,073 | 7/1928 | Carmichael | 287—128 |
| 2,160,035 | 5/1939 | Schwinn | 280—279 |
| 2,511,320 | 6/1950 | Benson | 280—279 |
| 2,768,836 | 10/1956 | Hilber | 280—276 |
| 3,113,785 | 12/1963 | Bohnenkamp | 280—278X |
| 3,341,237 | 9/1967 | Anzalone | 287—125 |

FOREIGN PATENTS

| | | | |
|---|---|---|---|
| 181,190 | 3/1953 | Austria | 280—276 |

KENNETH H. BETTS, Primary Examiner

U.S. Cl. X.R.

287—103